United States Patent [19]

Schowalter et al.

[11] 3,905,805

[45] Sept. 16, 1975

[54] RECYCLING OF FERROMANGANESE PRECIPITATOR DUSTS

[75] Inventors: Kenneth A. Schowalter; Richard H. Hunter, both of Monroeville Borough, Pa.

[73] Assignee: United States Steel Corporation, Pittsburgh, Pa.

[22] Filed: Sept. 12, 1973

[21] Appl. No.: 396,639

[52] U.S. Cl. .................................................. 75/25
[51] Int. Cl.² ........................................... C22B 7/02
[58] Field of Search............ 75/.5 AA, 25, 103, 25, 75/21, 3, 53, 55, 41, 42

[56] References Cited
UNITED STATES PATENTS

| | | | |
|---|---|---|---|
| 1,680,107 | 8/1928 | Marquard | 75/3 |
| 2,277,663 | 3/1942 | Francis et al. | 75/25 |
| 2,494,420 | 1/1950 | Wells et al. | 75/3 |
| 2,582,386 | 1/1952 | Komarek et al. | 75/3 |
| 2,861,881 | 11/1958 | Phelps | 75/25 |
| 2,877,086 | 3/1959 | Mackey | 75/25 X |
| 3,326,669 | 6/1967 | Sterling | 75/25 x |
| 3,567,811 | 3/1971 | Humphrey | 75/25 X |

*Primary Examiner*—L. Dewayne Rutledge
*Assistant Examiner*—M. J. Andrews
*Attorney, Agent, or Firm*—William L. Krayer

[57] ABSTRACT

A method is disclosed for recovering for beneficiation, the ferromanganese in blast furnace precipitator dust. The dusts and/or fines are collected by wet scrubber precipitators, filtered, and formed into a moist dust cake. The alkali therein is removed by treatment with coke plant flushing liquor or other solutions containing ammonium and chloride ions.

6 Claims, No Drawings

RECYCLING OF FERROMANGANESE PRECIPITATOR DUSTS

BACKGROUND OF THE INVENTION

Prior to our invention, it has not been known to recover for reuse the ferromanganese values found in blast furnace precipitator dust. In ferromanganese blast furnace practice, the waste dust is normally collected in a wet scrubber precipitator, and later filtered for disposal as a solid waste. Even the copious amounts of water used in such precipitators are not sufficient to remove the alkali from this waste dust. Accordingly, the ferromanganese values have in the past been wasted.

The gases from a ferromanganese blast furnace carry a combination of particulate matter and fume composed of volatilized metal and metal oxides. A dust-catcher or cyclone provides for the removal of the heavier particulate matter. Materials which escape the dustcatcher are collected by either an electrostatic precipitator or a wet scrubber. At one commercial installation investigated a wet scrubber is used and a moist dust-cake is obtained after a decantation and a filtration. The production of "dustcatcher-dust" and "wet scrubber cake" are reported as averaging 185 and 232 (dry basis) pounds per ton respectively. A comparison of "wet scrubber cake" and precipitator dust from another facility is given in Table A.

Table A

Composition of Ferromanganese Dust Samples
Wt %

|  | Mn | Fe | Al | Ca | K | Mg | Na |
|---|---|---|---|---|---|---|---|
| Plant A |  |  |  |  |  |  |  |
| Precipitator Dust | 23.9 | 4.9 | 8.0 | 7.0 | 2.0 | 1.0 | 0.4 |
| Plant B |  |  |  |  |  |  |  |
| Ferromanganese | 23.5 | 8.1 | 13.0 | 6.0 | 3.4 | 0.8 | 0.6 |
| Wet-Scrubber Cake | 23.1 | 7.9 | 12.2 | — | 3.5 | — | 0.4 |

Flushing liquor is produced by the cooling of the gases from a coke oven. This occurs in standpipes and collecting mains where sprays cool the gases from the oven from about 700° to about 75° C and in so doing cause moisture and tar to be condensed from the gas. The gas is then recycled to the sprays in the standpipes and collecting mains. Because most of the moisture in the coal and the water produced by carbonization of the coal collects in the flushing liquor system, a portion of the liquor must be periodically withdrawn from the system.

Table B

Analysis of Flushing Liquor

| Component | PPM |
|---|---|
| $NH_3$ (total) | 3300 |
| $Cl^-$ | 2740 |
| $K^+$ | 132 |
| $Na^+$ | 112 |
| $CN^-$ | 10 |
| $SCN^-$ | 23 |
| $Fe^+$ | 8 |
| $SO_4^=$ | 864 |

The reader may be interested, in connection with the description of our invention which follows, in reviewing Mackay U.S. Pat. No. 2,877,086, which discloses removing alkali metal cyanides entrained with ferromanganese furnace gases by recycling the wash water from the thickener back to the gas washer. Francis et al., in U.S. Pat. No. 2,277,663, review the problem of reclamation of ferromanganese flue dust. The chemistry of the extraction of manganese from ores by ammonium carbamate as discussed by Dean in Mining Engineering, January 1952, pp 55–60, may also be of interest to the reader.

SUMMARY OF THE INVENTION

We have found that, while plain water will not prepare the ferromanganese dust for reuse in the blast furnace, the use of significantly lower quantities of coke oven flushing liquor will remove the alkali and otherwise render the dust suitable for returning to the blast furnace.

The ferromanganese compositions described above are typical of those which may be used in our invention. The two significant ingredients of the ferromanganese, aside from the alkali, are iron, which may vary from 5–10%, and manganese, which may vary from 15–30%. Included in the term "alkali" as substances which are extracted are sodium and potassium ions.

In a preferred practice of our invention, alkali is extracted from the moist dust-cake by mixing the cake with coke-plant flushing-liquor water, and the remaining manganese-bearing solids are subsequently recovered. Although pre-dried cake is extracted equally well, the utilization of moist as-received cake is more practical in consideration of the nature of the process and the cost of drying facilities. Similarly, the flushing liquor is used in an as-received condition; however, it may sometimes be preferable to clarify the liquor to remove suspended tar particles. The mixing of the dust-cake and liquor may be accomplished by any device capable of disintegrating the dust-cake and dispersing the resultant particles within the liquor. Mixing time can be from 10 to 180 minutes; however, a more practical upper limit is 60 minutes, and we prefer to operate at a mixing time of about 15 minutes. During the extraction, the temperature may be maintained from 0° to 100°C, and a likely temperature range for commercial operations is 25° to 75°C. We prefer a temperature of about 50°C. Following the extraction, the beneficiated solids may be recovered by centrifugation, filtration, or decantation.

Assuming that high cake-to-extractant rates are indicative of the most efficient extractant, the superiority of flushing liquor is clearly apparent in Example 1. With water, the highest degree of alkali extraction, 57%, was obtained at a cake-to-extractant rate of 18.8 grams per liter. At a similar level of alkali extraction, a greater than ten-fold increase in this rate was obtained through the use of flushing liquor. Example 2 compares a dried, as-received dust-cake with a beneficiated product.

EXAMPLE 1

Moist dust-cake, collected by the wet-scrubber precipitators of a ferromanganese blast furnace, was extracted with coke-plant flushing liquor. The extractions were performed by adding from 10.0 to 45 grams of moist dust-cake to 200-milliliter portions of liquor and stirring the mixture in a 500-milliliter round-bottom flask for 2 hours at 50°C. Samples of the liquor were withdrawn, passed through an 8-micron filter, and analyzed for potassium, sodium, and lithium. The results show that between 60.7 and 83.8 percent of the total alkali in the dust-cake was extracted at cake-to-liquor ratios ranging from about 226 to 50 grams per liter. Similar procedures were used to evaluate water as an extractant. The results are presented in Table I.

Table I

Extraction of Wet-Precipitator Dust-Cakes With Coke-Plant Flushing Liquor

| Wet Cake*-to-Extractant Rate, g/l | Total Alkali Extracted, % |
|---|---|
| 50.12 | 83.8 |
| 60.00 | 78.8 |
| 66.77 | 75.4 |
| 110.22 | 79.6 |
| 159.78 | 70.9 |
| 171.39 | 66.2 |
| 194.12 | 63.3 |
| 226.07 | 60.7 |
| With Water (only) | |
| 18.80 | 57.2 |
| 25.70 | 53.5 |
| 42.11 | 48.6 |
| 62.08 | 39.0 |

*Cake contained 35.4 percent moisture.

EXAMPLE 2

Moist dust-cake was mixed with flushing liquor at a rate of 62 grams per liter. The mixture was stirred for 2 hours at 50°C and then filtered through an 8-micron filter. The recovered solids were dried at 120°C and analyzed; see Table II.

Table II

Analysis of Wet-Precipitator Dust-Cakes Before and After Beneficiation

| Component | Dried Dust-Cake | Dried Dust-Cake After Beneficiation* |
|---|---|---|
| Manganese, % | 23.30 | 23.96 |
| Iron, % | 7.89 | 5.53 |
| Potassium, % | 3.36 | 0.79 |
| Sodium, % | 0.51 | 0.20 |
| Lithium, % | 0.01 | 0.01 |
| Zinc, % | 0.50 | 0.53 |

*62 grams of moist dust-cake per liter of flushing liquor.

Solutions of ammonium chloride or ammonium chloride plus ammonia may be used instead of the flushing liquor as the extractant. In any case the ammonia or ammonium content should be at least 1200 mg/l. Both types of solutions are superior to water and closely approximate the performance of flushing liquor. Simple ammonium chloride solutions are most effective when the chloride ion concentration is equal to or greater than that of a typical flushing liquor, 2740 milligrams per liter. Practical performance is achieved at chloride concentrations of 2000 mg/l or more. The performance of these solutions may be slightly improved by adding ammonia in quantities sufficient to raise the total ammonia to a concentration that is equal to or greater than that of flushing liquor, 3300 milligrams per liter. However, the improvements are small and it appears that the chloride ion as well as the ammonium ion is essential to extractant effectiveness. A comparison of these extractants is presented in Example 3.

EXAMPLE 3

The procedures of Example 1 were followed to extract the moist dust-cake with ammonium chloride solutions and ammonium chloride plus ammonia solutions. The results are presented in Table III.

Table III

Extraction of Wet-Precipitator Dust-Cakes With Water, Ammonium Chloride Solutions, and Ammonium Chloride Plus Ammonia Solutions

| Moist Cake*-to-Extractant Rate, g/l | Concentration of Chloride Ion, mg/l | Concentration of Ammonia, mg/l | Total Alkali Extracted, % |
|---|---|---|---|
| Ammonium Chloride Solutions | | | |
| 154 | 830 | 397 | 47.0 |
| 154 | 2570 | 1230 | 57.0 |
| 154 | 3320 | 1590 | 58.4 |
| 154 | 6620 | 3180 | 64.7 |
| 154 | 6860 | 3290 | 65.0 |
| Ammonium Chloride Plus Ammonia Solutions | | | |
| 154 | 830 | 794 | 15.5 |
| 154 | 2560 | 2450 | 60.0 |
| 154 | 3310 | 3160 | 63.1 |
| 154 | 6550 | 6300 | 66.7 |
| 154 | 6770 | 6540 | 66.0 |

*Moist cake contains 35.4 percent water.

We do not intend to be restricted to the above specific examples and illustrations. Our invention may be otherwise practiced within the scope of the following claims.

We claim:

1. Method of preparing ferromanganese blast furnace dust for recharging into the ferromanganese blast furnace comprising treating ferromanganese dust containing sodium and potassium ions with an ammonium chloride solution for a period of 10 to 180 minutes at a temperature between 0° and 100° C. in order to remove the sodium and potassium, and separating the remaining solids from the solution.

2. Method of claim 1 in which the ammonium chloride solution is coke oven flushing liquor.

3. Method of claim 1 in which the solution has a chloride ion concentration of at least 2000 mg/l.

4. Method of claim 1 in which the moist dust-cake is treated with coke oven flushing liquor at 25°–75°C.

5. Method of claim 1 in which additional ammonia is added to said ammonium chloride solution.

6. Method of claim 1 in which the dust is in the form of a moist-dust cake formed by centrifugation of dust collected by wet scrubbing.

* * * * *